P. B. Tyler,
Saw Teeth,
N°14,172.    Patented Jan. 29, 1856.
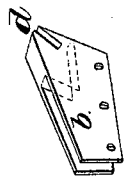
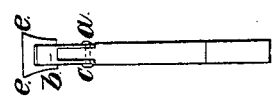
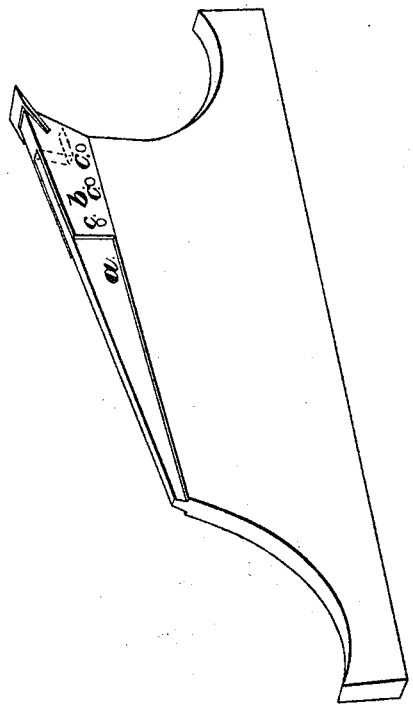
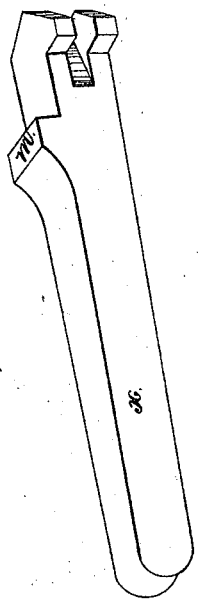

UNITED STATES PATENT OFFICE.

P. B. TYLER, OF SPRINGFIELD, MASSACHUSETTS.

METHOD OF ATTACHING TEETH TO SAW-PLATES.

Specification of Letters Patent No. 14,172, dated January 29, 1856.

*To all whom it may concern:*

Be it known that I, PHILOS B. TYLER, of Springfield, in the county of Hampden and State of Massachusetts, have invented certain new and useful Improvements in Forming and Holding the Ribs of Cutting-Points of Saw-Teeth and Renewing or Replacing the Same; and I hereby describe and ascertain the said improvement as follows, referring to the accompanying drawing for illustration.

For the purpose of connecting hardened points or nibs to saw teeth in a substantial manner and still be able to remove and replace them with facility when necessary from wear or other cause, it is essential to interpose a holder formed of hardened steel or other hardened metal in order to retain a perfect form and position for the receptacle of the nib although the nib can be fitted to the saw tooth, but not so securely, in which case the teeth on the saw plate would require to be hardened at great expense or the nib would soon become loose.

The construction is as follows: The saw plate of either a circular, or reciprocating saw, is first gummed, and the teeth made to assume the proper form, in a way well known to saw makers; after which the points or projecting positions of the teeth are rabbeted on each side, leaving that part somewhat thinner than the blade, with a shoulder at (*a*) as seen, Figures 1 and 2. This portion of the tooth receives the nib holder (*b*) which is firmly riveted to it as seen at (*c*) Fig. 1. The nib holder is represented in perspective at Fig. 3. It is a bifurcated piece of metal made very hard, the two forks of which fit over the reduced portion of the tooth on the saw plate, and embrace it; the connection between the two is made permanent by rivets passing through them all. The extreme projection of the nib holder in front of the tooth has an inclined slit (*d*) in it, into which the cutting nib is fitted. This cutting nib is a small piece of steel, shown detached, in plan and perspective, in Fig. 4; it is formed from a rod which has a groove milled in one of its flat sides, so as to leave the two projecting edges (*e, e*) one on either side, it is cut to the right length, and beveled for the cutting edge as seen in Fig. 4 and that part is hardened for cutting, leaving the shank or lower portion soft for riveting as hereafter described.

The nib thus formed readily slides into the nib holder down to the bottom of the slit (*d*) at the base of which a little notch is made so that when the soft metal of the shank of the nib is forced up against the sides of the hardened nib-holder, is swaged to the form of the notch, and slit tightly securing it in its place. This last act of riveting the nib to its place can be performed by a blow of a hammer against one side, while a swage of some sort is held against the other; or in any convenient way.

To make the set on the nib, I mill off a portion on each side below the cutting edge, as clearly seen in Fig. 4, so as to have that edge broader than the shank below by thus constructing each saw tooth, I secure a very durable and perfect cutting edge, and if the nib holders are first carefully set in line, the cutters are sure to track each other without any nice adjustment from the operative using the saw.

When one set of nibs are broken or worn, by sawing or sharpening, too short for further use, they can be easily removed without injury to the nib-holder by a tool that I have constructed for the purpose, and shown in Fig. 5; it consists of a bar of metal (*x*) divided at its lower end, so as to straddle the nib-holder. The forks being hooked at the end, take hold of the projecting part of the nib on each side, when by striking the projection (*m*) on one side of the bar with a hammer, the nib is easily driven out, and the holder is ready to receive a new nib. These can be furnished by the quantity cheap, and their fitting up, sharpening, &c., is much less expensive than sharpening an ordinary saw, while their cutting is easier and more perfect, and they are less frequently dulled.

Having thus fully described my improvement, what I claim as my invention is—

1. The hardened nib holder, attached to the saw plate at each tooth, to hold a small cutting nib as described.

2. I also claim the cutting nibs attached to the saw teeth, whether by means of the nib holder or directly connected with the plate, constructed and combined with the saw specifically as herein specified.

PHILOS B. TYLER.

Witnesses:
J. C. GREENOUGH,
FREDK. G. BURNHAM.